US009670784B2

(12) United States Patent
Herzlinger et al.

(10) Patent No.: US 9,670,784 B2
(45) Date of Patent: Jun. 6, 2017

(54) TURBINE BUCKET BASE HAVING SERPENTINE COOLING PASSAGE WITH LEADING EDGE COOLING

(71) Applicant: General Electric Company, Schenectady, NY (US)

(72) Inventors: Jason Douglas Herzlinger, Glenville, NY (US); Harish Bommanakatte, Bangalore (IN); Anthony Louis Giglio, Baton Rouge, LA (US); Jacob Charles Perry, II, Taylors, SC (US)

(73) Assignee: General Electric Company, Schenectady, NY (US)

( * ) Notice: Subject to any disclaimer, the term of this patent is extended or adjusted under 35 U.S.C. 154(b) by 594 days.

(21) Appl. No.: 14/061,193

(22) Filed: Oct. 23, 2013

(65) Prior Publication Data

US 2015/0110641 A1    Apr. 23, 2015

(51) Int. Cl.
*F01D 5/18* (2006.01)
(52) U.S. Cl.
CPC ............. *F01D 5/187* (2013.01); *F01D 5/186* (2013.01); *Y02E 20/16* (2013.01); *Y02T 50/672* (2013.01); *Y02T 50/676* (2013.01)
(58) Field of Classification Search
CPC ................................ F01D 5/186; F01D 5/187
USPC ........................................ 416/97 R; 415/115
See application file for complete search history.

(56) References Cited

U.S. PATENT DOCUMENTS 1,828,409 A   10/1931  Densmore
1,955,929 A    4/1934  Mueller
2,714,499 A    8/1955  Warner
3,844,679 A *  10/1974  Grondahl ............... F01D 5/185
                                                           416/95
4,208,167 A    6/1980  Yasugahira et al.
(Continued)

FOREIGN PATENT DOCUMENTS

EP    2479381 A1    7/2012

OTHER PUBLICATIONS

Booth et al., "Rotor-Tip Leakage: Part 1—Basic Methodology", Journal of Engineering for Power, Transactions of the ASME, vol. 104, Jan. 1982, pp. 154-161.

(Continued)

*Primary Examiner* — Woody Lee, Jr.
(74) *Attorney, Agent, or Firm* — Ernest G. Cusick; Hoffman Warnick LLC

(57) ABSTRACT

Various embodiments of the invention include turbine buckets and systems employing such buckets. Various particular embodiments include a turbine bucket having: a base including: a casing having at least one exhaust aperture on an outer surface of the casing; and a core within the casing, the core having: a serpentine cooling passage; and at least one outlet passage fluidly connected with the serpentine cooling passage and the exhaust aperture, wherein the at least one outlet passage permits flow of a coolant from the serpentine cooling passage to the at least one exhaust aperture on the outer surface of the casing; and an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

18 Claims, 6 Drawing Sheets

(56) References Cited

U.S. PATENT DOCUMENTS

| | | | |
|---|---|---|---|
| 4,604,031 A | 8/1986 | Moss et al. | |
| 4,627,480 A | 12/1986 | Lee | |
| 4,682,935 A | 7/1987 | Martin | |
| 5,073,086 A | 12/1991 | Cooper | |
| 5,088,892 A | 2/1992 | Weingold et al. | |
| 5,282,721 A | 2/1994 | Kildea | |
| 5,286,168 A | 2/1994 | Smith | |
| 5,397,217 A | 3/1995 | DeMarche et al. | |
| 5,480,285 A | 1/1996 | Patel et al. | |
| 5,503,527 A | 4/1996 | Lee et al. | |
| 5,525,038 A | 6/1996 | Sharma et al. | |
| 5,536,143 A | 7/1996 | Jacala et al. | |
| 5,738,489 A | 4/1998 | Lee | |
| 5,848,876 A | 12/1998 | Tomita | |
| 5,873,695 A | 2/1999 | Takeishi et al. | |
| 5,924,843 A | 7/1999 | Staub et al. | |
| 5,980,209 A | 11/1999 | Barry et al. | |
| 6,017,189 A * | 1/2000 | Judet | F01D 5/081 416/193 A |
| 6,019,579 A | 2/2000 | Fukuno et al. | |
| 6,072,829 A | 6/2000 | Dirr | |
| 6,077,034 A | 6/2000 | Tomita et al. | |
| 6,079,948 A | 6/2000 | Sasaki et al. | |
| 6,086,328 A | 7/2000 | Lee | |
| 6,142,739 A | 11/2000 | Harvey | |
| 6,190,130 B1 | 2/2001 | Fukue et al. | |
| 6,241,467 B1 * | 6/2001 | Zelesky | F01D 5/187 415/115 |
| 6,257,830 B1 | 7/2001 | Matsuura et al. | |
| 6,419,446 B1 | 7/2002 | Kvasnak et al. | |
| 6,422,817 B1 | 7/2002 | Jacala | |
| 6,464,462 B2 | 10/2002 | Stathopoulos et al. | |
| 6,474,947 B1 | 11/2002 | Yuri | |
| 6,491,493 B1 | 12/2002 | Watanabe et al. | |
| 6,491,496 B2 | 12/2002 | Starkweather | |
| 6,554,564 B1 | 4/2003 | Lord | |
| 6,579,066 B1 | 6/2003 | Saito et al. | |
| 6,595,750 B2 | 7/2003 | Parneix et al. | |
| 6,672,829 B1 | 1/2004 | Cherry et al. | |
| 6,722,851 B1 | 4/2004 | Brittingham et al. | |
| 6,761,535 B1 | 7/2004 | McGrath et al. | |
| 6,790,005 B2 | 9/2004 | Lee et al. | |
| 6,799,948 B2 | 10/2004 | Ito et al. | |
| 6,887,042 B2 | 5/2005 | Ito et al. | |
| 6,957,949 B2 | 10/2005 | Hyde et al. | |
| 6,966,756 B2 | 11/2005 | McGrath et al. | |
| 6,969,232 B2 | 11/2005 | Zess et al. | |
| 7,029,235 B2 | 4/2006 | Liang | |
| 7,048,509 B2 | 5/2006 | Tominaga et al. | |
| 7,118,329 B2 | 10/2006 | Goodman | |
| 7,134,842 B2 | 11/2006 | Tam et al. | |
| 7,220,100 B2 | 5/2007 | Lee et al. | |
| 7,255,536 B2 * | 8/2007 | Cunha | F01D 5/18 416/193 A |
| 7,281,894 B2 | 10/2007 | Lee et al. | |
| 7,300,247 B2 | 11/2007 | Nomura et al. | |
| 7,309,212 B2 * | 12/2007 | Itzel | F01D 5/082 416/193 A |
| 7,377,746 B2 | 5/2008 | Brassfield et al. | |
| 7,416,391 B2 | 8/2008 | Veltre et al. | |
| 7,476,086 B2 | 1/2009 | Wadia et al. | |
| 7,544,043 B2 | 6/2009 | Eastman et al. | |
| 7,597,539 B1 | 10/2009 | Liang | |
| 7,632,062 B2 | 12/2009 | Harvey et al. | |
| 7,641,446 B2 | 1/2010 | Harvey | |
| 7,674,093 B2 | 3/2010 | Lee et al. | |
| 7,726,937 B2 | 6/2010 | Baumann et al. | |
| 7,731,483 B2 | 6/2010 | DeLong et al. | |
| 7,766,606 B2 | 8/2010 | Liang | |
| 7,931,444 B2 | 4/2011 | Godsk et al. | |
| 7,972,115 B2 | 7/2011 | Potier | |
| 7,985,053 B2 | 7/2011 | Schott et al. | |
| 7,997,875 B2 | 8/2011 | Nanukuttan et al. | |
| 8,047,802 B2 | 11/2011 | Clemen | |
| 8,052,395 B2 | 11/2011 | Tragesser | |
| 8,092,178 B2 | 1/2012 | Marini et al. | |
| 8,105,031 B2 | 1/2012 | Trindade et al. | |
| 8,105,037 B2 | 1/2012 | Grover et al. | |
| 8,133,030 B2 | 3/2012 | Grafitti et al. | |
| 8,133,032 B2 | 3/2012 | Tibbott et al. | |
| 8,147,188 B2 | 4/2012 | Reeves et al. | |
| 8,172,533 B2 | 5/2012 | Pinero et al. | |
| 8,347,947 B2 | 1/2013 | Dube et al. | |
| 8,371,815 B2 | 2/2013 | Farrell | |
| 8,414,265 B2 | 4/2013 | Willett, Jr. | |
| 8,449,249 B2 | 5/2013 | Suchezky | |
| 8,568,097 B1 | 10/2013 | Liang | |
| 8,591,189 B2 | 11/2013 | Correia et al. | |
| 8,602,740 B2 | 12/2013 | O'Hearn et al. | |
| 8,647,066 B2 | 2/2014 | Guimbard et al. | |
| 8,647,067 B2 | 2/2014 | Pandey et al. | |
| 8,662,825 B2 | 3/2014 | Ireland et al. | |
| 8,684,684 B2 | 4/2014 | Clements et al. | |
| 8,720,207 B2 | 5/2014 | Gersbach et al. | |
| 8,721,291 B2 | 5/2014 | Lee et al. | |
| 8,777,572 B2 | 7/2014 | Cheong et al. | |
| 8,821,111 B2 | 9/2014 | Gear et al. | |
| 8,870,524 B1 | 10/2014 | Liang | |
| 8,870,525 B2 * | 10/2014 | Walunj | F01D 5/081 415/115 |
| 8,967,959 B2 | 3/2015 | Stein et al. | |
| 9,103,213 B2 | 8/2015 | Barr et al. | |
| 9,188,017 B2 | 11/2015 | Xu | |
| 2002/0141863 A1 | 10/2002 | Liu et al. | |
| 2004/0062636 A1 | 4/2004 | Mazzola et al. | |
| 2004/0081548 A1 | 4/2004 | Zess et al. | |
| 2007/0059173 A1 | 3/2007 | Lee et al. | |
| 2007/0059182 A1 | 3/2007 | Stegemiller et al. | |
| 2007/0128033 A1 | 6/2007 | Lee et al. | |
| 2007/0258810 A1 | 11/2007 | Aotsuka et al. | |
| 2007/0258819 A1 | 11/2007 | Allen-Bradley et al. | |
| 2008/0213098 A1 | 9/2008 | Neef et al. | |
| 2008/0232968 A1 | 9/2008 | Nguyen | |
| 2009/0003987 A1 | 1/2009 | Zausner et al. | |
| 2010/0047065 A1 | 2/2010 | Sakamoto et al. | |
| 2010/0143139 A1 | 6/2010 | Pandey et al. | |
| 2010/0158696 A1 | 6/2010 | Pandey et al. | |
| 2010/0189023 A1 | 7/2010 | Lindgren et al. | |
| 2010/0196154 A1 | 8/2010 | Sakamoto et al. | |
| 2010/0221122 A1 | 9/2010 | Klasing et al. | |
| 2010/0278644 A1 | 11/2010 | Gersbach et al. | |
| 2011/0044818 A1 | 2/2011 | Kuhne et al. | |
| 2011/0058958 A1 | 3/2011 | Ireland et al. | |
| 2011/0255990 A1 | 10/2011 | Diamond et al. | |
| 2012/0163993 A1 | 6/2012 | Levine et al. | |
| 2012/0201688 A1 | 8/2012 | Mahle et al. | |
| 2012/0328451 A1 * | 12/2012 | Lomas | F01D 5/187 416/97 R |
| 2013/0017095 A1 | 1/2013 | Lee et al. | |
| 2013/0108424 A1 | 5/2013 | Stein et al. | |
| 2013/0224040 A1 | 8/2013 | Straccia | |
| 2014/0119942 A1 | 5/2014 | Lehmann et al. | |
| 2014/0271225 A1 | 9/2014 | Herzlinger et al. | |
| 2015/0110639 A1 | 4/2015 | Herzlinger et al. | |
| 2015/0110640 A1 | 4/2015 | Herzlinger et al. | |
| 2015/0110641 A1 | 4/2015 | Herzlinger et al. | |

OTHER PUBLICATIONS

U.S. Appl. No. 14/060,996, Notice of Allowance dated May 25, 2016, 17 pages.

U.S. Appl. No. 14/061,107, Notice of Allowance dated Jul. 15, 2016, 26 pages.

U.S. Appl. No. 14/061,363, Final Office Action 1 dated Aug. 12, 2016, 37 pages.

U.S. Appl. No. 14/060,996, Final Office Action 1 dated Mar. 4, 2016, 15 pages.

U.S. Appl. No. 14/061,221, Office Action 1 dated Mar. 14, 2016, 15 pages.

U.S. Appl. No. 14/061,363, Office Action 1 dated Mar. 28, 2016, 23 pages.

U.S. Appl. No. 14/061,158 Office Action 1 dated Aug. 10, 2016, 60 pages.

(56) References Cited

OTHER PUBLICATIONS

U.S. Appl. No. 14/061,221, Final Office Action 1 dated Jul. 11, 2016, 18 pages.
U.S. Appl. No. 14/061,107, Office Action dated Apr. 5, 2016, 15 pages.
U.S. Appl. No. 14/061,146, Notice of Allowance dated Apr. 11, 2016, 24 pages.
U.S. Appl. No. 14/061,169, Office Action 1 dated Jul. 13, 2016, 40 pages.

* cited by examiner

TURBINE BUCKET BASE HAVING SERPENTINE COOLING PASSAGE WITH LEADING EDGE COOLING

FIELD OF THE INVENTION

The subject matter disclosed herein relates to turbomachines. More particularly, the subject matter disclosed herein relates to components within turbomachines such as gas and/or steam turbines.

BACKGROUND OF THE INVENTION

Gas turbine systems are one example of turbomachines widely utilized in fields such as power generation. A conventional gas turbine system includes a compressor section, a combustor section, and a turbine section. During operation of the gas turbine system, various components in the system are subjected to high temperature flows, which can cause the components to fail. Since higher temperature flows generally result in increased performance, efficiency, and power output of the gas turbine system, it may be desirable to cool the components that are subjected to high temperature flows to allow the gas turbine system to operate at increased temperatures.

Many system requirements are instituted for each stage of the turbine section, or hot gas path section, of a gas turbine system in order to meet design goals including overall improved efficiency and airfoil loading. Particularly, the buckets of the first stage of the turbine section are designed meet the operating requirements for that particular stage and also meet requirements for bucket cooling area and wall thickness. However, conventional designs fail to meet these operating requirements in some cases.

BRIEF DESCRIPTION OF THE INVENTION

Various embodiments of the invention include turbine buckets and systems employing such buckets. Various particular embodiments include a turbine bucket having: a base including: a casing having at least one exhaust aperture on an outer surface of the casing; and a core within the casing, the core having: a serpentine cooling passage; and at least one outlet passage fluidly connected with the serpentine cooling passage and the exhaust aperture, wherein the at least one outlet passage permits flow of a coolant from the serpentine cooling passage to the at least one exhaust aperture on the outer surface of the casing; and an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

A first aspect of the invention includes a turbine bucket having: a base including: a casing having at least one exhaust aperture on an outer surface of the casing; and a core within the casing, the core having: a serpentine cooling passage; and at least one outlet passage fluidly connected with the serpentine cooling passage and the exhaust aperture, wherein the at least one outlet passage permits flow of a coolant from the serpentine cooling passage to the at least one exhaust aperture on the outer surface of the casing; and an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

A second aspect of the invention includes a turbine rotor section including: a set of buckets, the set of buckets including at least one bucket having: a base including: a casing having at least one exhaust aperture on an outer surface of the casing; and a core within the casing, the core having: a serpentine cooling passage; and at least one outlet passage fluidly connected with the serpentine cooling passage and the exhaust aperture, wherein the at least one outlet passage permits flow of a coolant from the serpentine cooling passage to the at least one exhaust aperture on the outer surface of the casing; and an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

A third aspect of the invention includes a turbine having: a diaphragm section; and a rotor section at least partially contained within the diaphragm section, the rotor section having a set of buckets including at least one bucket having: a base including: a casing having at least one exhaust aperture on an outer surface of the casing; and a core within the casing, the core having: a serpentine cooling passage; and at least one outlet passage fluidly connected with the serpentine cooling passage and the exhaust aperture, wherein the at least one outlet passage permits flow of a coolant from the serpentine cooling passage to the at least one exhaust aperture on the outer surface of the casing; and an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
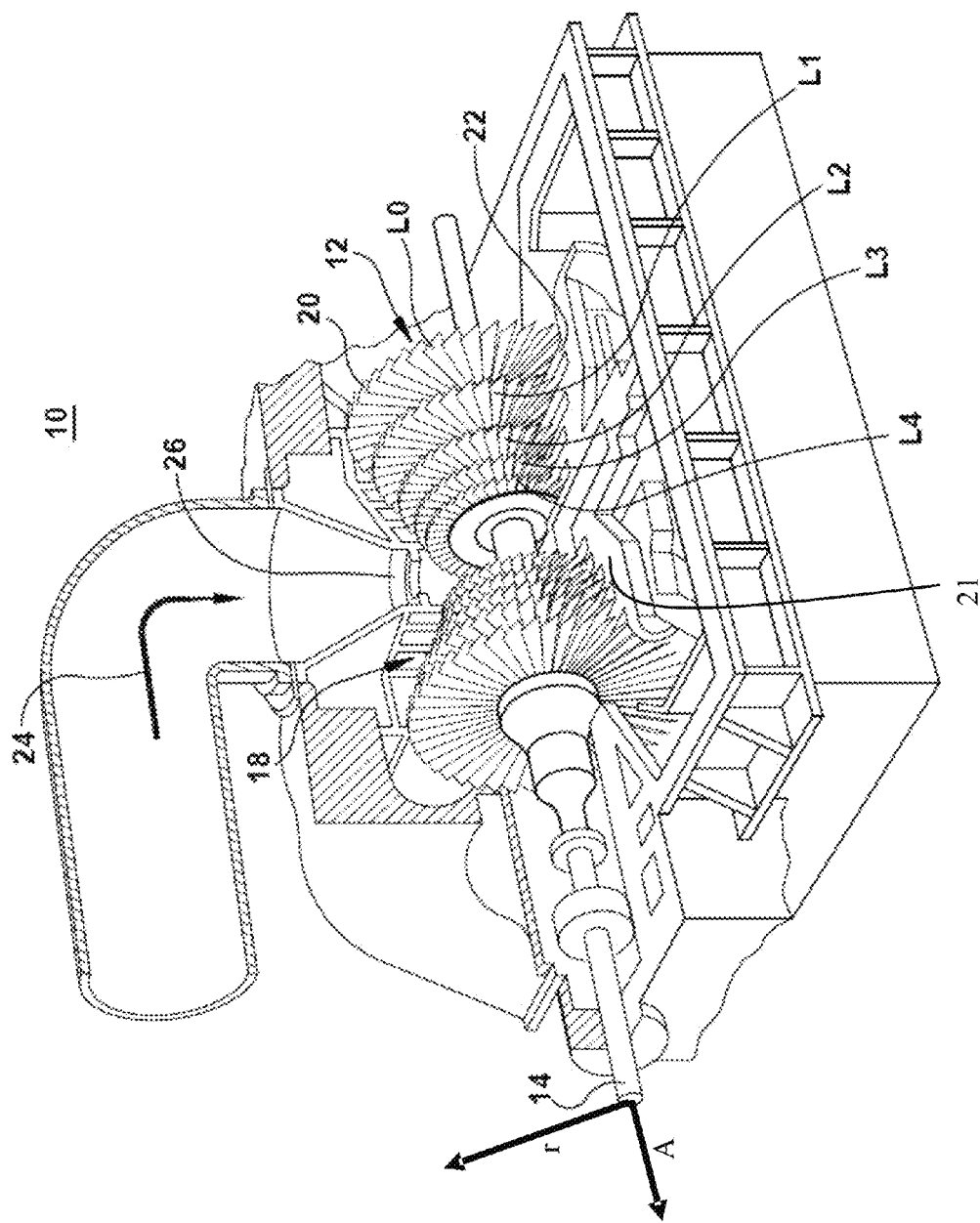
FIG. 1 shows a three-dimensional partial cut-away perspective view of a portion of a turbine according to an embodiment of the invention.

It is noted that the drawings of the invention are not necessarily to scale. The drawings are intended to depict only typical aspects of the invention, and therefore should not be considered as limiting the scope of the invention. It is understood that elements similarly numbered between the FIGURES may be substantially similar as described with reference to one another. Further, in embodiments shown and described with reference to FIGS. 1-6, like numbering may represent like elements. Redundant explanation of these elements has been omitted for clarity. Finally, it is understood that the components of FIGS. 1-6 and their accompanying descriptions may be applied to any embodiment described herein.

DETAILED DESCRIPTION OF THE INVENTION

As noted herein, various aspects of the invention are directed toward turbine buckets. Particular aspects of the invention include turbine buckets having a base/platform with a serpentine cooling conduit.

In contrast to conventional turbine buckets, aspects of the invention include a turbine bucket (e.g., a dynamic bucket for driving a turbine shaft) having a serpentine cooling conduit core within its base. The bucket can also include a leading edge passage fluidly connected with an aperture on the leading edge of the base. The bucket can also include an airfoil profile for enhancing leading edge cooling of the bucket and base. The base can also include a support structure positioned adjacent the serpentine cooling conduit. The serpentine cooling conduit can provide enhanced cooling of the bucket when compared with conventional bucket base structures, in particular, proximate the leading edge of the bucket and base. In particular cases, the serpentine cooling conduit is located proximate the pressure side of the airfoil, within the base. Location of the serpentine cooling conduit proximate the pressure side of the airfoil provides for cooling of the base proximate the pressure side of the airfoil, where high-pressure and high-temperature working fluid (e.g., gas or steam) impact the airfoil and the base.

As used herein, the terms "axial" and/or "axially" refer to the relative position/direction of objects along axis A, which is substantially parallel to the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference which surrounds axis A but does not intersect the axis A at any location. Further, the terms leading edge/pressure side refer to components and/or surfaces which are oriented upstream relative to the fluid flow of the system, and the terms trailing edge/suction side refer to components and/or surfaces which are oriented downstream relative to the fluid flow of the system.

In the following description, reference is made to the accompanying drawings that form a part thereof, and in which is shown by way of illustration specific embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Referring to the drawings, FIG. 1 shows a perspective partial cut-away illustration of a turbine 10 (e.g., a gas or steam turbine) according to various embodiments of the invention. Turbine 10 includes a rotor 12 that includes a rotating shaft 14 and a plurality of axially spaced rotor wheels 18. A plurality of rotating buckets 20 (dynamic buckets) are mechanically coupled to each rotor wheel 18. More specifically, buckets 20 are arranged in rows that extend circumferentially around each rotor wheel 18. A diaphragm 21 is shown including a plurality of stationary blades (or, vanes) 22 that circumferentially around shaft 14, and the blades 22 are axially positioned between adjacent rows of buckets 20. Stationary blades 22 cooperate with buckets 20 to form a stage of the turbine 10, and to define a portion of a flow path through turbine 10. As shown, the diaphragm 21 at least partially surrounds the rotor 12 (shown in this cut-away view). It is understood that the turbine 10 shown is a dual-flow turbine 10 that includes an axially centered inlet mouth which feeds two sets of turbine stages. It is understood that various teachings can be applied to axial turbines, e.g., axial inlet gas turbines that inlet a combustion gas from a first axial end and outlet that combustion gas to a second axial end after the gas has performed mechanical work on the turbine.

Returning to FIG. 1, in operation, gas 24 enters an inlet 26 of turbine 10 and is channeled through stationary blades 22. Blades 22 direct gas 24 against buckets 20. Gas 24 passes through the remaining stages imparting a force on buckets 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine. In another embodiment, turbine 10 may comprise an aircraft engine used to produce thrust.

Figure 2:
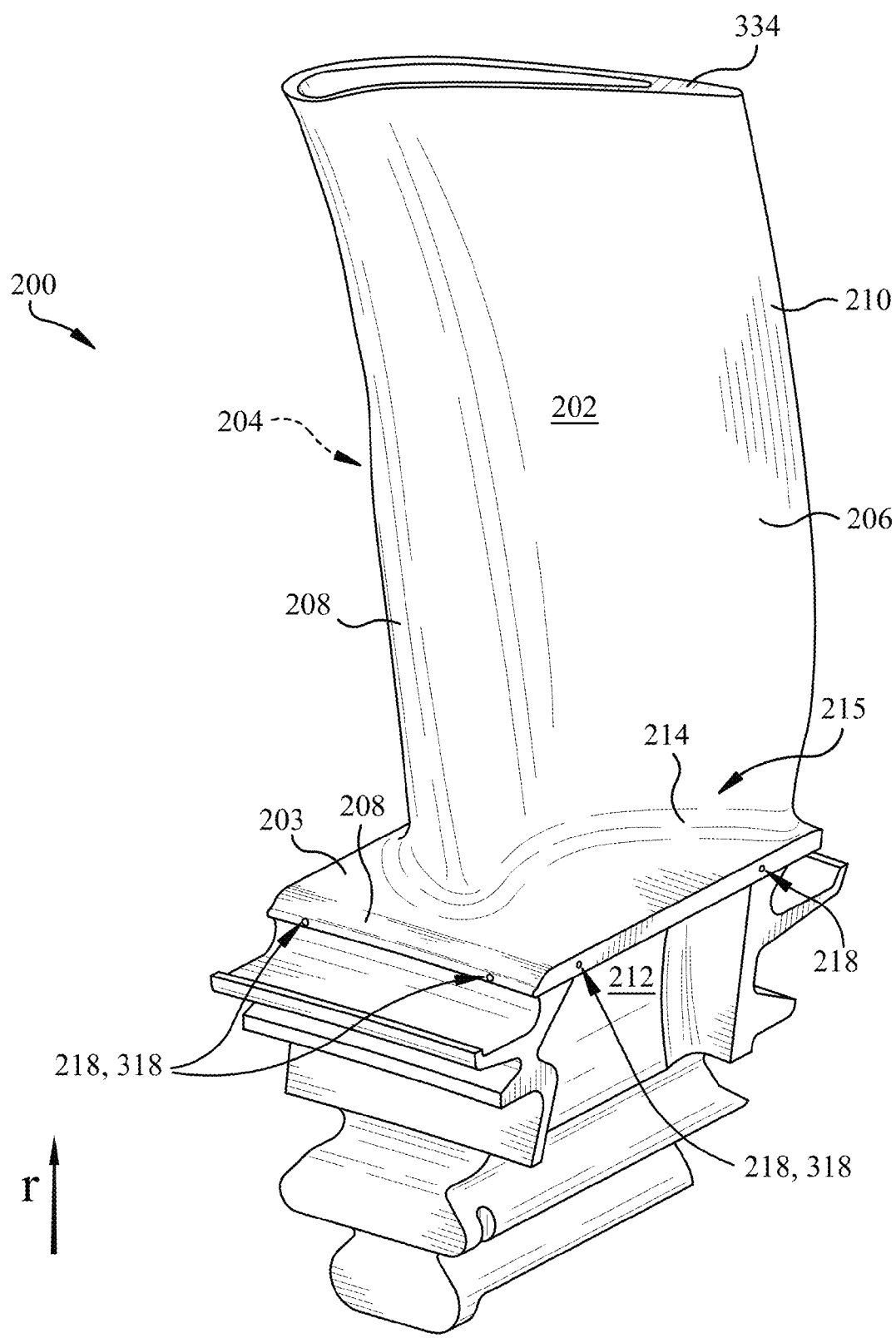
FIG. 2 shows a schematic three-dimensional depiction of a turbine bucket including an airfoil and a base according to various embodiments of the invention.

Turning to FIG. 2, a schematic three-dimensional depiction of a turbine bucket (or simply, bucket) 200 is shown according to various embodiments. The bucket 200 is a rotatable (dynamic) bucket which is part of a set of buckets circumferentially dispersed about a rotor shaft in a stage of a turbine (e.g., turbine 10). It is understood that in various embodiments, the bucket 200 can be implemented in a turbine (e.g., turbine 10, FIG. 1), just as the bucket(s) 20 shown and described with respect to FIG. 1. That is, during operation of a turbine (e.g., turbine 10), the bucket 200 will rotate about the axis A as a working fluid (e.g., gas or steam) is directed across the bucket's airfoil, initiating rotation of a rotor shaft (e.g., shaft 14). It is understood that bucket 200 is configured to couple (mechanically couple via fasteners, welds, slot/grooves, etc.) with a plurality of similar or distinct buckets (e.g., buckets 200 or other buckets) to form a set of buckets in a stage of the turbine.

Returning to FIG. 2, the turbine bucket 200 can include an airfoil 202 having a suction side 204 (obstructed in this view), and a pressure side 206 opposing the suction side 204. The bucket 200 can also include a leading edge 208 spanning between the pressure side 206 and the suction side 204, and a trailing edge 210 opposing the leading edge 208 and spanning between the pressure side 206 and the suction side 204. It is understood that in various embodiments, the bucket 200 can be a first stage (L4) bucket, exposed to higher temperature and pressure working fluid (e.g., gas or steam) than buckets located in later stages (e.g., L3-L0). As described herein, various aspects of the turbine bucket 200 allow for improved product life and performance in a turbine utilizing such a bucket.

As shown, the bucket 200 can also include a base 212 connected with the airfoil 202. The base 212 can be connected with the airfoil 202 along the suction side 204, pressure side 206, trailing edge 210 and the leading edge 208. In this view, only the casing 203 of the base 212 is visible, as its core structure (300, FIG. 3) is obstructed by the casing 203. The core structure (300, FIG. 3) will be described in greater detail herein.

In various embodiments, the bucket 200 includes a fillet 214 proximate a first end 215 of the airfoil 202, the fillet 214 connecting the airfoil 202 and the base 212. The fillet 214 can include a weld or braze fillet, which may be formed via conventional MIG welding, TIG welding, brazing, etc. As is known in the art, the base 212 is designed to fit into a mating slot in the turbine rotor shaft (e.g., shaft 14) and mate with adjacent base components of other buckets 200. The base 212 is designed to be located radially inboard of the airfoil 202.

In various embodiments, as described herein, the base 212 can include at least one cooling aperture 218 along its outer surface (e.g., along its leading edge 208) for permitting exhaust of cooling fluid from the core of the base 212 to the exterior of the base 212. As described herein, the aperture(s) 218 can be fluidly connected with a serpentine cooling passage (304, FIG. 3) in the core of the base 212, and together, the aperture 218 and the cooling passage 304 can permit flow of the working fluid through portions of the core of the base 212 to the exterior of the base 212. The coolant flow can enter the main body core from a dedicated supply source from the bucket feed area, or via fluid connection with the main body core (underlying the airfoil 202, obstructed in FIG. 3), flow through the cooling passage(s) 304, and can exit the core via one or more exhaust apertures 218. It is understood that in various embodiments, one or more exhaust aperture(s) 218 can be located along the leading edge 208 of the base 212, and in some embodiments, one or more exhaust aperture(s) 218 can be located along the leading edge 208, trailing edge 210 and/or other surfaces of the base 212. As described with reference to FIG. 3, some exhaust apertures 318 proximate the leading edge 208 of the base 212 can have a greater diameter than the exhaust apertures 218 along the pressure/suction side of the base 212 and/or along the trailing edge 210. The larger apertures 318 proximate the leading edge 208 can provide for enhanced cooling of the leading edge 208. In various embodiments, the size of the apertures (e.g., exhaust apertures 218 or 318) can be tailored to meet specific flow or temperature requirements or desires.

Figure 3:
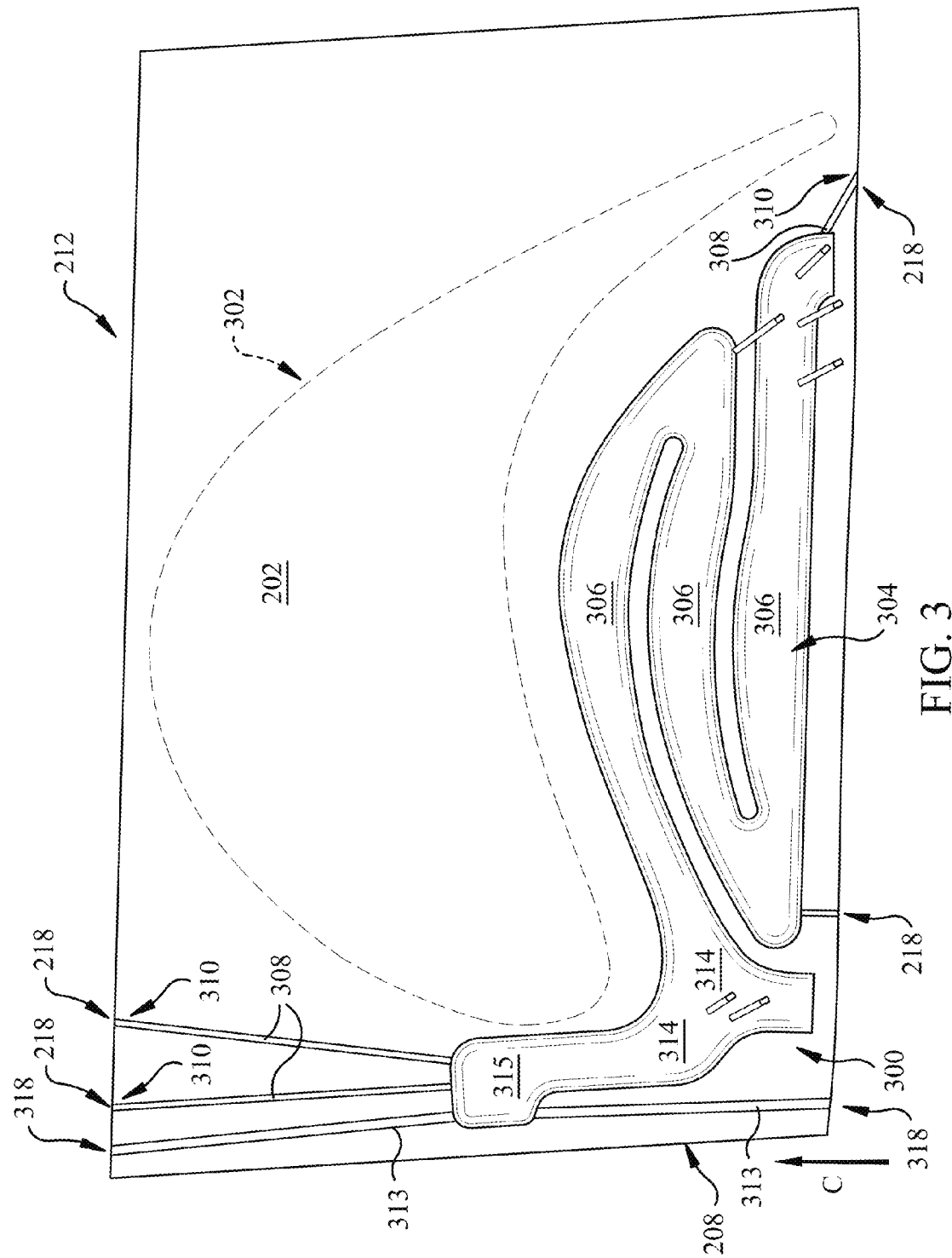
FIG. 3 shows a schematic cut-away view of a core of the turbine bucket of FIG. 2 according to various embodiments of the invention.

FIG. 3 shows a schematic three-dimensional depiction of a core structure 300 within the casing 203 of the base 212. The platform core structure (or simply, core) 300 can include a support structure 302 (shown in phantom) for supporting the casing 203 underlying the airfoil 202. In various embodiments, the support structure 302 is formed of a metal, e.g., steel, aluminum, and/or alloys of these or other metals, or a composite. The platform core 300 can further include and a serpentine shaped cooling passage (or simply, serpentine passage) 304 fluidly connected with at least one exhaust aperture (e.g., exhaust aperture(s) 218, 318) on the outer surface of the casing 203, e.g., proximate the leading edge 208.

In various embodiments, the serpentine passage 304 includes a set of contiguous, circumferentially overlapping cooling passages 306. These cooling passages 306 can at least partially overlap in the circumferential direction, increasing the surface area exposure of the serpentine passage 304 within the core 300, thereby enhancing heat transfer. As described herein, the set of contiguous circumferentially overlapping cooling passages 306 can be formed of one or more substantially unitary pieces of material, e.g., a metal such as steel, aluminum and/or alloys of those metals. In various embodiments, the set of contiguous circumferentially overlapping cooling passages 306 are formed as a substantially unitary structure, and can be integrally formed, e.g., via integral casting and/or forging. In some alternative embodiments, the contiguous circumferentially overlapping cooling passages 306 can be formed from separate passage members that are bonded together to substantially eliminate seams or discontinuities between these separate members. In some particular cases, these separate members are welded and/or brazed together. It is understood that the term "circumferentially overlapping" can refer to two structures (or the same structure) that can be intersected by the same circumferentially extending line (as delineated by the directional arrow (C) in FIG. 3). That is, in the case of the circumferentially overlapping cooling passages 306, at several locations, a line extending in the circumferential direction (c) will intersect three distinct cooling passages 306 in the serpentine passage 304.

In some embodiments, as shown in FIG. 3, the serpentine passage 304 includes at least one outlet passage 308 fluidly connected with one of the set of contiguous circumferentially overlapping cooling passages 306. The serpentine passage 304 can also include at least one outlet 310 fluidly connected with one of the set of contiguous circumferentially overlapping cooling passages 306 and the exhaust aperture(s) 218 (FIG. 2). As shown and described herein, the at least one cooling aperture 218 on the outer surface of the casing 203 can include a plurality of cooling apertures 218, and in some particular embodiments, the plurality of cooling apertures 218 are located proximate the leading edge 208 of the base 212. In various embodiments, the serpentine passage includes at least one leading edge outlet passage 313 (also referred to as nose cooling passages) fluidly connected with the cooling aperture(s) 318 proximate the leading edge 208 of the base 212. These leading edge outlet passages 313 can have a greater inner diameter than the other outlet passages 308 located farther from the leading edge 208. In various embodiments, these leading edge outlet passages 313 can enhance cooling of the base 212 proximate the leading edge 208 by allowing a greater volume of coolant fluid to flow through this region (and/or flow at a greater rate) to enhance heat transfer proximate the leading edge 208.

In various embodiments, the serpentine passage 304 includes a hub region 314 fluidly connected with at least one of the plurality of cooling apertures 218, 318 located proximate the leading edge 208 of the airfoil 202. The hub region 314 can be located proximate the leading edge 208 of the airfoil 202, and can act as a distribution region for providing cooling fluid from the serpentine passage 304 to one or more cooling apertures 218, 318. As shown in FIG. 3, the serpentine cooling passage 304 (aside from the hub region 314) can be located substantially proximate the pressure side 206 of the airfoil 202, which, as noted herein, can aid in cooling this pressure side 206 of the airfoil 202 as it encounters high-pressure, high-temperature working fluid during operation of a turbine employing such a bucket. According to various embodiments, the serpentine passage 304 includes a head region 315 located proximate the leading edge 208 of the base 212 for enhanced cooling of the nose region (area proximate the leading edge 208). This head region 315 can have a bulbous, rounded, squared, elongated, etc., shape that has sufficient surface area to aid in cooling the area proximate the leading edge 208 (nose region) of the base 212. It is understood that in various embodiments, the serpentine passage 304, and in particular, the hub region 314 and/or head region 315 can be located closer to the suction side 204 of the base 212 to enhance cooling in that region as well. The location of the serpentine passage 304 (including the hub 314 and head 315 regions) is merely illustrative of one of many configurations possible, and should not be considered limiting of the invention.

The bucket internal core profile is defined by a unique loci of points which achieves the necessary structural and cooling requirements whereby improved turbine performance is obtained. This unique loci of points define the internal nominal core profile and are identified by the X, Y and Z Cartesian coordinates of Table I which follows. The 3700 points for the coordinate values shown in Table I are for a cold, i.e., room temperature bucket at various cross-sections of the bucket along its length. The positive X, Y and Z directions are axial toward the exhaust end of the turbine, tangential in the direction of engine rotation looking aft and radially outwardly toward the bucket tip, respectively. The X and Y coordinates are given in distance dimensions, e.g., units of inches, and are joined smoothly at each Z location to form a smooth continuous internal core profile cross-section. The Z coordinates are given in non-dimensionalized form from 0 to 1. By multiplying the airfoil height dimension, e.g., in inches, by the non-dimensional Z value of Table I, the internal core profile, of the bucket is obtained. Each defined internal core profile section in the X, Y plane is joined smoothly with adjacent profile sections in the Z direction to form the complete internal bucket core profile.

The Table I values are generated and shown to five decimal places for determining the internal core profile of the bucket. There are typical manufacturing tolerances as well as coatings which should be accounted for in the actual internal profile of the bucket. Accordingly, the values for the profile given in Table 1 are for a nominal internal bucket core profile. It will therefore be appreciated that +/- typical manufacturing tolerances, i.e., +/- values, including any coating thicknesses, are additive to the X and Y values given in Table I below. Accordingly, a manufacturing tolerance of plus or minus 0.005 (non-dimensional) in a direction normal to any surface location along the internal core profile defines an internal core profile envelope for this particular bucket design and turbine, i.e., a range of variation between measured points on the actual internal core profile at nominal cold or room temperature and the ideal position of those points as given in Table I below at the same temperature. The internal core profile is robust to this range of variation without impairment of mechanical and cooling functions.

The coordinate values given in Table I below provide the preferred nominal internal core profile envelope.

TABLE 1

Non-Dimensionalized [X Y/Max. X Length]

| N | X | Y |
|---|---|---|
| 1 | 0.00000 | -0.02859 |
| 2 | 0.00000 | 0.01429 |

TABLE 1-continued

Non-Dimensionalized [X Y/Max. X Length]

| N | X | Y |
|---|---|---|
| 3 | 0.00000 | 0.00000 |
| 4 | 0.00000 | -0.01429 |
| 5 | 0.00000 | 0.02859 |
| 6 | 0.00084 | -0.03456 |
| 7 | 0.00105 | 0.03523 |
| 8 | 0.00332 | -0.04009 |
| 9 | 0.00411 | 0.04123 |
| 10 | 0.00724 | -0.04467 |
| 11 | 0.00887 | 0.04599 |
| 12 | 0.01229 | -0.04802 |
| 13 | 0.01487 | 0.04905 |
| 14 | 0.01805 | -0.04981 |
| 15 | 0.02151 | 0.05010 |
| 16 | 0.02381 | -0.05163 |
| 17 | 0.02885 | -0.05495 |
| 18 | 0.03277 | -0.05957 |
| 19 | 0.03322 | 0.05010 |
| 20 | 0.03526 | -0.06506 |
| 21 | 0.03609 | -0.08476 |
| 22 | 0.03609 | -0.19433 |
| 23 | 0.03609 | -0.20803 |
| 24 | 0.03609 | -0.16694 |
| 25 | 0.03609 | -0.12585 |
| 26 | 0.03609 | -0.09846 |
| 27 | 0.03609 | -0.11215 |
| 28 | 0.03609 | -0.13954 |
| 29 | 0.03609 | -0.07106 |
| 30 | 0.03609 | -0.15324 |
| 31 | 0.03609 | -0.18063 |
| 32 | 0.03741 | -0.22168 |
| 33 | 0.04128 | -0.23482 |
| 34 | 0.04494 | 0.05010 |
| 35 | 0.04759 | -0.24699 |
| 36 | 0.05610 | -0.25774 |
| 37 | 0.05665 | 0.05010 |
| 38 | 0.06650 | -0.26666 |
| 39 | 0.06836 | 0.05010 |
| 40 | 0.07551 | -0.27452 |
| 41 | 0.07945 | 0.04836 |
| 42 | 0.08268 | -0.28409 |
| 43 | 0.08770 | -0.35221 |
| 44 | 0.08772 | -0.29494 |
| 45 | 0.08870 | -0.34042 |
| 46 | 0.08944 | 0.04326 |
| 47 | 0.08973 | -0.32864 |
| 48 | 0.09040 | -0.30658 |
| 49 | 0.09062 | -0.31855 |
| 50 | 0.09738 | 0.03533 |
| 51 | 0.10247 | 0.02534 |
| 52 | 0.10422 | -0.07176 |
| 53 | 0.10422 | -0.05744 |
| 54 | 0.10422 | -0.02876 |
| 55 | 0.10422 | -0.04310 |
| 56 | 0.10422 | -0.10044 |
| 57 | 0.10422 | 0.01425 |
| 58 | 0.10422 | -0.01441 |
| 59 | 0.10422 | -0.00010 |
| 60 | 0.10422 | -0.11476 |
| 61 | 0.10422 | -0.08610 |
| 62 | 0.10422 | -0.12910 |
| 63 | 0.10594 | -0.35379 |
| 64 | 0.10680 | -0.14789 |
| 65 | 0.11433 | -0.16529 |
| 66 | 0.12382 | -0.35534 |
| 67 | 0.12628 | -0.18001 |
| 68 | 0.14167 | -0.35692 |
| 69 | 0.14174 | -0.19098 |
| 70 | 0.15955 | -0.35847 |
| 71 | 0.15958 | -0.19739 |
| 72 | 0.17743 | -0.36002 |
| 73 | 0.17860 | -0.20033 |
| 74 | 0.19531 | -0.36158 |
| 75 | 0.19760 | -0.20093 |
| 76 | 0.21317 | -0.36313 |
| 77 | 0.21666 | -0.19918 |
| 78 | 0.23105 | -0.36469 |

TABLE 1-continued

Non-Dimensionalized [X Y/Max. X Length]

| N | X | Y |
|---|---|---|
| 79 | 0.23551 | −0.19564 |
| 80 | 0.24892 | −0.36626 |
| 81 | 0.25406 | −0.19089 |
| 82 | 0.26680 | −0.36782 |
| 83 | 0.27237 | −0.18534 |
| 84 | 0.28468 | −0.36937 |
| 85 | 0.29049 | −0.17927 |
| 86 | 0.30254 | −0.37092 |
| 87 | 0.30856 | −0.17298 |
| 88 | 0.32042 | −0.37248 |
| 89 | 0.32666 | −0.16672 |
| 90 | 0.33830 | −0.37403 |
| 91 | 0.34475 | −0.16058 |
| 92 | 0.35618 | −0.37561 |
| 93 | 0.36294 | −0.15463 |
| 94 | 0.37403 | −0.37716 |
| 95 | 0.38118 | −0.14884 |
| 96 | 0.39191 | −0.37872 |
| 97 | 0.39946 | −0.14325 |
| 98 | 0.40979 | −0.38027 |
| 99 | 0.41785 | −0.13792 |
| 100 | 0.42767 | −0.38182 |
| 101 | 0.43627 | −0.13288 |
| 102 | 0.44555 | −0.38338 |
| 103 | 0.45482 | −0.12814 |
| 104 | 0.46340 | −0.38493 |
| 105 | 0.47344 | −0.12382 |
| 106 | 0.48128 | −0.38651 |
| 107 | 0.49218 | −0.11992 |
| 108 | 0.49916 | −0.38806 |
| 109 | 0.51102 | −0.11653 |
| 110 | 0.51704 | −0.38962 |
| 111 | 0.52993 | −0.11366 |
| 112 | 0.53490 | −0.39117 |
| 113 | 0.54893 | −0.11139 |
| 114 | 0.55278 | −0.39272 |
| 115 | 0.56798 | −0.10974 |
| 116 | 0.57066 | −0.39428 |
| 117 | 0.58708 | −0.10878 |
| 118 | 0.58854 | −0.39586 |
| 119 | 0.60622 | −0.10859 |
| 120 | 0.60639 | −0.39741 |
| 121 | 0.62427 | −0.39896 |
| 122 | 0.62535 | −0.10940 |
| 123 | 0.64215 | −0.40052 |
| 124 | 0.64437 | −0.11146 |
| 125 | 0.66003 | −0.40207 |
| 126 | 0.66321 | −0.11488 |
| 127 | 0.67791 | −0.40362 |
| 128 | 0.68173 | −0.11971 |
| 129 | 0.69576 | −0.40520 |
| 130 | 0.69983 | −0.12592 |
| 131 | 0.71364 | −0.40675 |
| 132 | 0.71747 | −0.13333 |
| 133 | 0.73152 | −0.40831 |
| 134 | 0.73463 | −0.14182 |
| 135 | 0.74940 | −0.40986 |
| 136 | 0.75134 | −0.15116 |
| 137 | 0.76726 | −0.41142 |
| 138 | 0.76757 | −0.16127 |
| 139 | 0.78330 | −0.17220 |
| 140 | 0.78514 | −0.41297 |
| 141 | 0.79847 | −0.18384 |
| 142 | 0.80302 | −0.41452 |
| 143 | 0.81322 | −0.19603 |
| 144 | 0.82090 | −0.41610 |
| 145 | 0.82754 | −0.20870 |
| 146 | 0.83875 | −0.41765 |
| 147 | 0.84140 | −0.22189 |
| 148 | 0.85479 | −0.23556 |
| 149 | 0.85663 | −0.41921 |
| 150 | 0.86772 | −0.24964 |
| 151 | 0.87451 | −0.42076 |
| 152 | 0.88022 | −0.26413 |
| 153 | 0.89227 | −0.27899 |
| 154 | 0.89239 | −0.42232 |
| 155 | 0.90491 | −0.29336 |
| 156 | 0.91027 | −0.42387 |
| 157 | 0.91773 | −0.30758 |
| 158 | 0.92812 | −0.42545 |
| 159 | 0.93054 | −0.32180 |
| 160 | 0.94333 | −0.33603 |
| 161 | 0.94600 | −0.42700 |
| 162 | 0.95614 | −0.35025 |
| 163 | 0.96388 | −0.42855 |
| 164 | 0.96895 | −0.36445 |
| 165 | 0.98176 | −0.37867 |
| 166 | 0.98176 | −0.43011 |
| 167 | 0.99025 | −0.39026 |
| 168 | 0.99627 | −0.40334 |
| 169 | 0.99957 | −0.41732 |
| 170 | 1.00000 | −0.43171 |

It will also be appreciated that the bucket disclosed in the above Table may be scaled up or down geometrically for use in other similar turbine designs. Consequently, the coordinate values set forth in Table 1 may be scaled upwardly or downwardly such that the internal profile shape of the bucket remains unchanged. A scaled version of the coordinates in Table 1 would be represented by X, Y and Z coordinate values of Table 1, with the non-dimensional X, Y and Z coordinate values for example converted to inches, multiplied and/or divided by a constant number.

Figure 4:
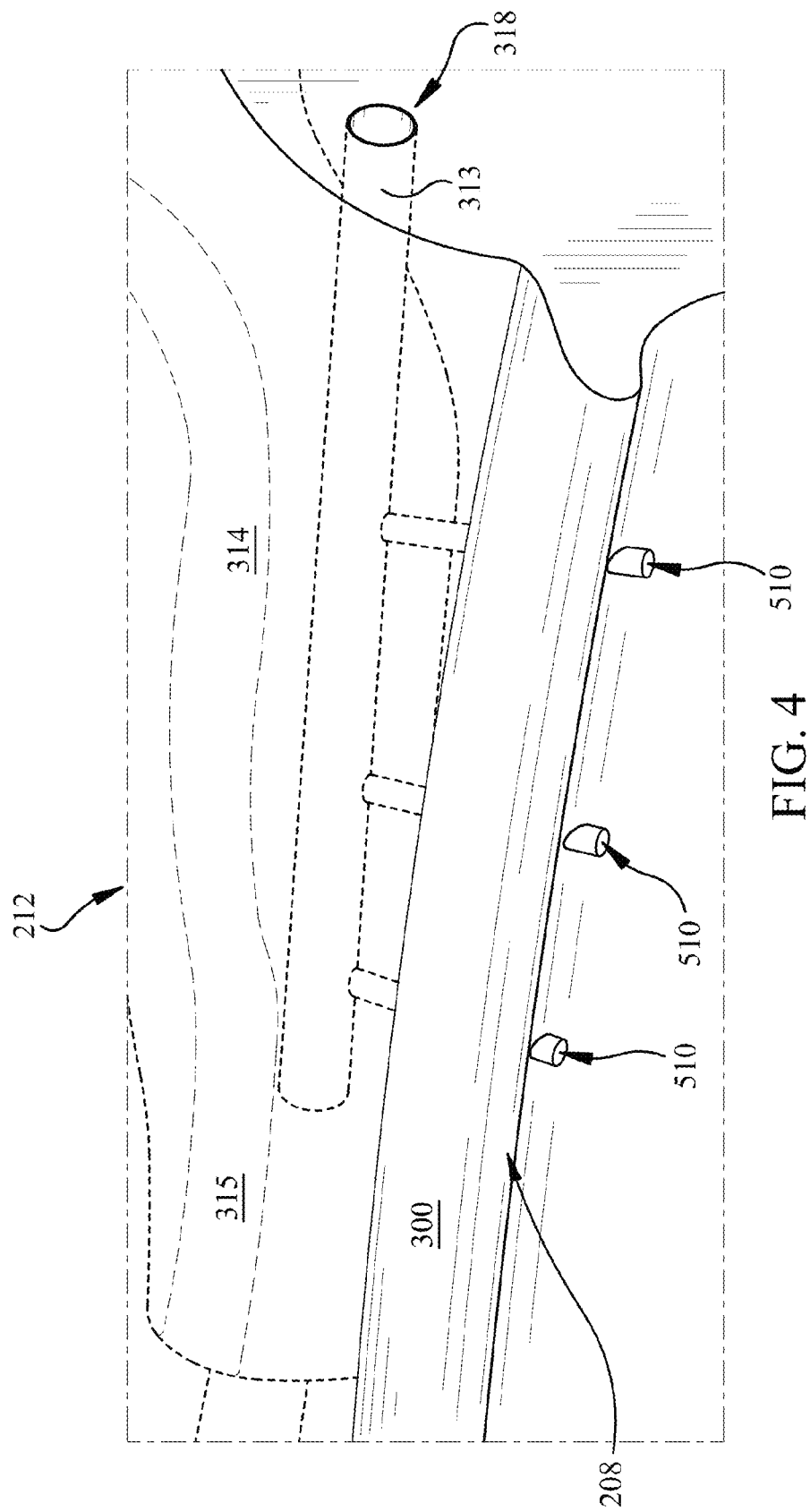
FIG. 4 shows a schematic cut-away view of a leading edge of a core structure according to various embodiments of the invention.

FIG. 4 shows a three-dimensional perspective view of a leading edge section 208 of a base 212 according to various alternative embodiments. In these embodiments, at least one leak-off cooling conduit 510 is fluidly connected with the leading edge outlet passage(s) 313, which extend through the head region 315 proximate the leading edge 208. The leak-off cooling conduits 510 can allow for cooling fluid to flow out of the serpentine passage 304 along the leading edge 208 of the base 212, thereby enhancing cooling of the leading edge 208. It is understood that any number of leak-off cooling conduits 510 can be utilized to enhance cooling along the leading edge 208. In various embodiments, a plurality of leak-off cooling conduits 510 can be fluidly connected with one or more of the leading edge outlet passage(s) 313, and can provide for cooling of the leading edge from regions proximate the suction side 204 and/or pressure side 204 of the base 212.

Figure 5:
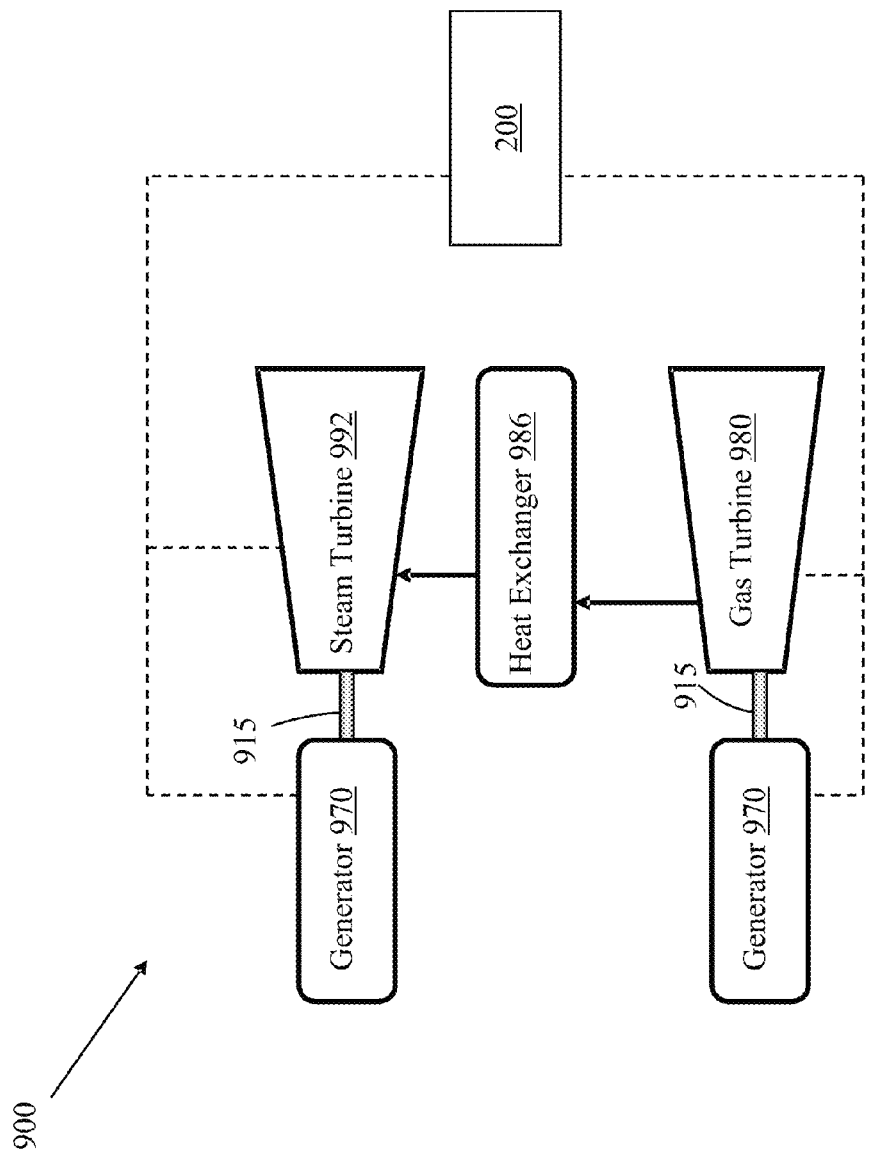
FIG. 5 shows a schematic block diagram illustrating portions of a multi-shaft combined cycle power plant system according to embodiments of the invention.
Figure 6:
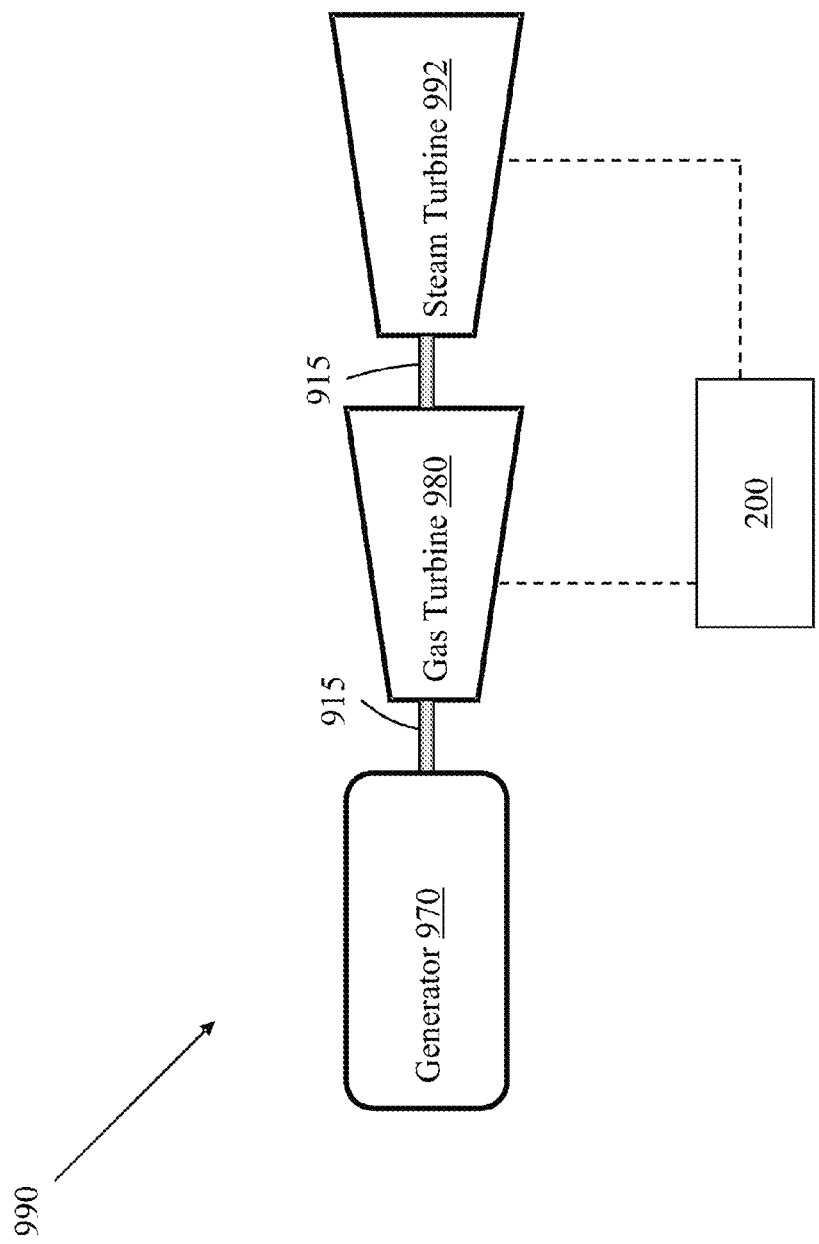
FIG. 6 shows a schematic block diagram illustrating portions of a single-shaft combined cycle power plant system according to embodiments of the invention.

Turning to FIG. 5, a schematic view of portions of a multi-shaft combined cycle power plant 900 is shown. Combined cycle power plant 900 may include, for example, a gas turbine 980 operably connected to a generator 970. Generator 970 and gas turbine 980 may be mechanically coupled by a shaft 915, which may transfer energy between a drive shaft (not shown) of gas turbine 980 and generator 970. Also shown in FIG. 5 is a heat exchanger 986 operably connected to gas turbine 980 and a steam turbine 992. Heat exchanger 986 may be fluidly connected to both gas turbine 980 and a steam turbine 992 via conventional conduits (numbering omitted). Gas turbine 980 and/or steam turbine 992 may include one or more buckets 200 as shown and described with reference to FIG. 2 and/or other embodiments described herein. Heat exchanger 986 may be a conventional heat recovery steam generator (HRSG), such as those used in conventional combined cycle power systems. As is known in the art of power generation, HRSG 986 may use hot exhaust from gas turbine 980, combined with a water supply, to create steam which is fed to steam turbine 992. Steam turbine 992 may optionally be coupled to a second generator system 970 (via a second shaft 915). It is understood that generators 970 and shafts 915 may be of any size or type known in the art and may differ depending upon their application or the system to which they are connected. Common numbering of the generators and shafts is for clarity and does not necessarily suggest these generators or shafts are identical. In another embodiment, shown in FIG. 6, a single shaft combined cycle power plant 990 may include a single generator 970 coupled to both gas turbine 980 and steam turbine 992 via a single shaft 915. Steam turbine 992 and/or gas turbine 980 may include one or more buckets 200 shown and described with reference to FIG. 2 and/or other embodiments described herein.

The apparatus and devices of the present disclosure are not limited to any one particular engine, turbine, jet engine, generator, power generation system or other system, and may be used with other aircraft systems, power generation systems and/or systems (e.g., combined cycle, simple cycle, nuclear reactor, etc.). Additionally, the apparatus of the present invention may be used with other systems not described herein that may benefit from the increased reduced tip leakage and increased efficiency of the apparatus and devices described herein.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A turbine bucket comprising:
   a base including:
   a casing having at least one exhaust aperture on an outer surface of the casing; and
   a core within the casing, the core having:
   a serpentine cooling passage; and
   at least one outlet passage fluidly connected with the serpentine cooling passage and the exhaust aperture,
   wherein the at least one outlet passage permits flow of a coolant from the serpentine cooling passage to the at least one exhaust aperture on the outer surface of the casing, wherein the at least one exhaust aperture on the outer surface of the casing includes a plurality of exhaust apertures located proximate the leading edge of the base, wherein the serpentine cooling passage includes a head region fluidly connected with each of the plurality of exhaust apertures located proximate the leading edge of the base, wherein the head region is located at a terminal end of the serpentine cooling passage forward of the leading edge of the airfoil and proximate the leading edge of the base and permits flow of the cooling fluid to the at least one exhaust aperture and outlet passage; the at least one exhaust aperture extending directly from the head region; and
   an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

2. The turbine bucket of claim 1, wherein the serpentine shaped cooling passage includes a set of contiguous circumferentially overlapping cooling passages.

3. The turbine bucket of claim 2, wherein the at least one outlet passage includes a leading edge outlet passage proximate the leading edge of the base.

4. The turbine bucket of claim 1, wherein the turbine bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the bucket in inches, and wherein X and Y are non-dimensional values which, when connected by smooth continuing arcs, define internal core profile sections at each distance Z along the bucket, the profile sections at the Z distances being joined smoothly with one another to form said bucket internal core profile.

5. The turbine bucket of claim 1, wherein the turbine bucket includes a first stage bucket.

6. The turbine bucket of claim 1, wherein the base is radially inboard of the airfoil.

7. The turbine bucket of claim 1, wherein the serpentine cooling passage is located substantially proximate the pressure side of the airfoil.

8. The turbine bucket of claim 1, wherein the serpentine passage includes a hub region fluidly connected with at least one of the plurality of exhaust apertures, the hub region located proximate the leading edge of the airfoil.

9. A turbine rotor section comprising:
A set of buckets, the set of buckets including at least one bucket having:
a base including:
a casing having at least one exhaust aperture on an outer surface of the casing; and
a core within the casing, the core having:
a serpentine cooling passage; and
at least one outlet passage fluidly connected with the serpentine cooling passage and the exhaust aperture,
wherein the at least one outlet passage permits flow of a coolant from the serpentine cooling passage to the at least one exhaust aperture on the outer surface of the casing, wherein the at least one exhaust aperture on the outer surface of the casing includes a plurality of exhaust apertures located proximate the leading edge of the base, wherein the serpentine cooling passage includes a head region fluidly connected with each of the plurality of exhaust apertures located proximate the leading edge of the base, wherein the head region is located at a terminal end of the serpentine cooling passage forward of the leading edge of the airfoil and proximate the leading edge of the base and permits flow of the cooling fluid to the at least one exhaust aperture and outlet passage; the at least one exhaust aperture extending directly from the head region; and
an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

10. The turbine rotor section of claim 9, wherein the serpentine shaped cooling passage includes a set of contiguous circumferentially overlapping cooling passages.

11. The turbine rotor section of claim 10, wherein the at least one outlet passage includes a leading edge outlet passage proximate the leading edge of the base.

12. The turbine rotor section of claim 9, wherein the turbine bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the bucket in inches, and wherein X and Y are non-dimensional values which, when connected by smooth continuing arcs, define internal core profile sections at each distance Z along the bucket, the profile sections at the Z distances being joined smoothly with one another to form said bucket internal core profile.

13. The turbine rotor section of claim 9, wherein the turbine bucket includes a first stage bucket.

14. The turbine rotor section of claim 9, wherein the serpentine cooling passage is located substantially proximate the pressure side of the airfoil.

15. The turbine rotor section of claim 9, wherein the serpentine passage includes a hub region fluidly connected with at least one of the plurality of exhaust apertures, the hub region located proximate the leading edge of the airfoil.

16. A turbine rotor section comprising:
a diaphragm section; and
a rotor section at least partially contained within the diaphragm section, the rotor section having a set of buckets including at least one bucket having:
a base including:
a casing having at least one exhaust aperture on an outer surface of the casing; and
a core within the casing, the core having:
a serpentine cooling passage; and
at least one outlet passage fluidly connected with the serpentine cooling passage and the exhaust aperture,
wherein the at least one outlet passage permits flow of a coolant from the serpentine cooling passage to the at least one exhaust aperture on the outer surface of the casing, wherein the at least one exhaust aperture on the outer surface of the casing includes a plurality of exhaust apertures located proximate the leading edge of the base, wherein the serpentine cooling passage includes a head region fluidly connected with each of the plurality of exhaust apertures located proximate the leading edge of the base, wherein the head region is located at a terminal end of the serpentine cooling passage forward of the leading edge of the airfoil and proximate the leading edge of the base and permits flow of the cooling fluid to the at least one exhaust aperture and outlet passage; the at least one exhaust aperture extending directly from the head region; and
an airfoil connected with the base at a first end of the airfoil, the airfoil including: a suction side; a pressure side opposing the suction side; a leading edge spanning between the pressure side and the suction side; and a trailing edge opposing the leading edge and spanning between the pressure side and the suction side.

17. The turbine of claim 16, wherein the serpentine shaped cooling passage includes a set of contiguous circumferentially overlapping cooling passages, wherein the at least one outlet passage includes a leading edge outlet passage proximate the leading edge of the base, wherein the turbine bucket has a nominal internal core profile substantially in accordance with Cartesian coordinate values of X, Y and Z set forth in Table I, wherein the Z values are non-dimensional values from 0 to 1 convertible to Z distances in inches by multiplying the Z values by a height of the bucket in inches, and wherein X and Y are non-dimensional values which, when connected by smooth continuing arcs, define internal core profile sections at each distance Z along the bucket, the profile sections at the Z distances being joined smoothly with one another to form said bucket internal core profile.

18. The turbine of claim 16, wherein the serpentine passage includes a hub region fluidly connected with at least one of the plurality of exhaust apertures, the hub region located proximate the leading edge of the airfoil.

* * * * *